_United States Patent Office_

3,446,120
Patented May 27, 1969

3,446,120
OSCILLATING FLUID-DRIVEN ACTUATOR
Franz Sneen, Topasgatan 40, V. Frolunda,
Goteborg, Sweden
Filed Nov. 14, 1966, Ser. No. 594,208
Claims priority, application Sweden, Dec. 13, 1965,
16,096/65
Int. Cl. F01c 9/00; F16j 1/00, 9/12
U.S. Cl. 92—120                                                   3 Claims

ABSTRACT OF THE DISCLOSURE

An oscillating piston fluid-driven actuator having an annular segment-shaped piston slidably mounted in an annular segment-shaped chamber. The piston is integrally formed with an arm and a hub which in turn is operatively connected to a rotary shaft. A fitting plate carries a sealing member at one or both ends of the piston and is connected to the piston to allow the plate radial movement on the pistons, whereby the sealing member is maintained in central bearing engagement with the chamber irrespective of deflections in the piston relative to the chamber.

---

The present invention relates to an arrangement in hydraulic and pneumatic oscillating fluid-driven piston actuators of the type comprising at least one annular segment shaped piston mounted in at least one annular segment-shaped chamber which is disposed in a casing and includes at least one radial partition sealingly bearing against the walls of the chamber. The casing is provided with passages for the supply and withdrawal of the fluid pressure medium which are disposed on both sides and within the partition, and with at least one sector-shaped clearance extending from the chamber or chambers inwardly towards a central shaft bore, through which clearance is passed, at least one arm adapted to connect directly or indirectly the piston or pistons with a shaft, the connection may be formed as an annular hub, the pressure-loaded end or ends of every annular piston being equipped with resilient sealing member adapted to continuously and sealingly engage walls of the chamber.

The characteristic feature of the arrangement according to the invention is the combination wherein the annular piston or pistons, arm or arms and shaft are so formed that they form a coherent unit, and the sealing collars are mounted in holders which are so attached to the flanged ends of the annular piston or pistons as to be slidable at least radially upon the pistons which are formed with play.

The invention consists in an oscillating fluid-driven actuator comprising at least one annular segment-shaped piston mounted for oscillating movement in a correspondingly annular segment-shaped chamber, said piston integrally formed with a hub which is adapted to receive an oscillating shaft and at least one arm connecting said piston to the hub, and at least one end of said piston having a resilient sealing member and fitting means adapted for radial movement and supporting said sealing member on said end of said piston whereby said sealing member will continuously bear against the walls of the chamber.

The invention will now be described with reference to the accompanying drawings, which show embodiments of the invention, but in no restrictive sense.

Figure 1:
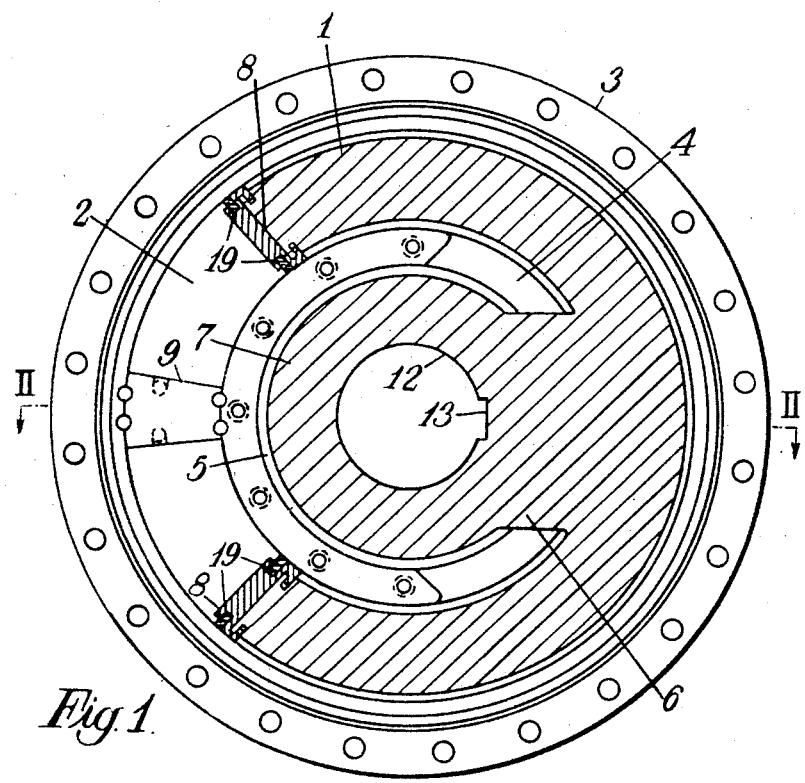
Figure 2:
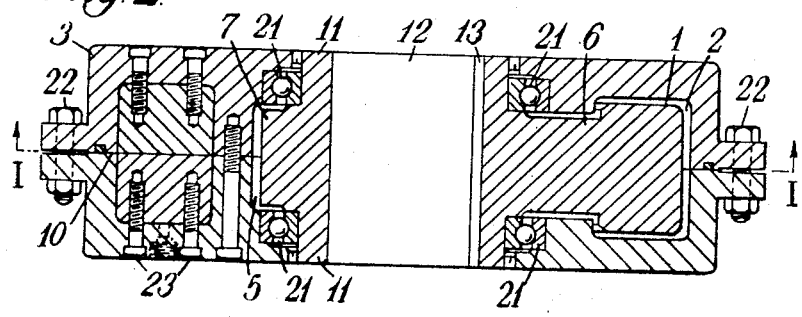
Figure 3:
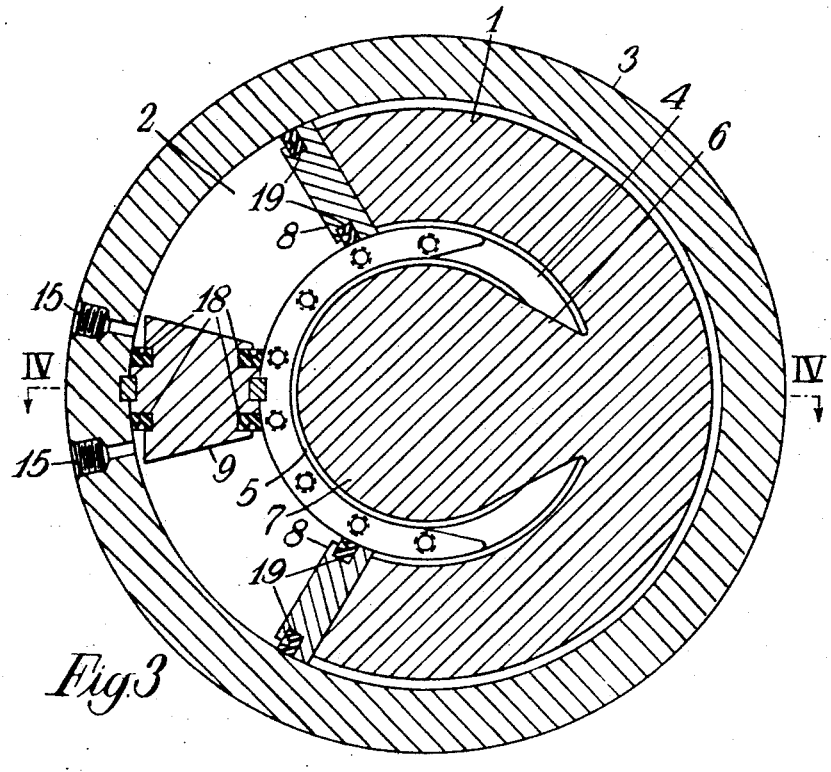
Figure 4:
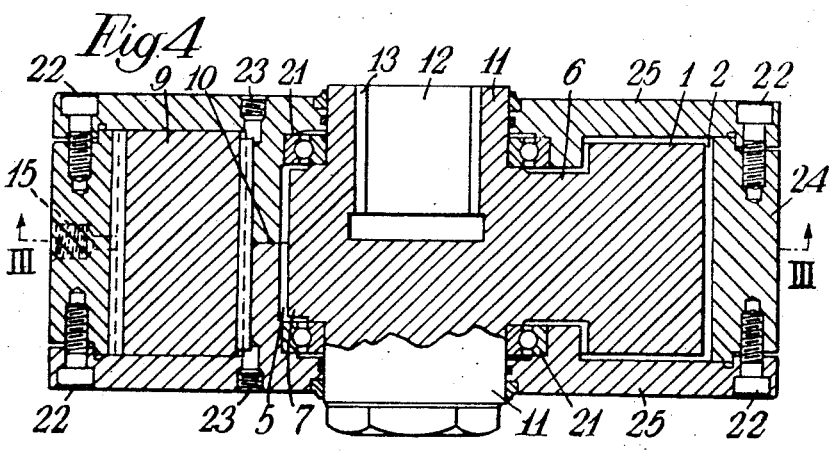
Figure 5:
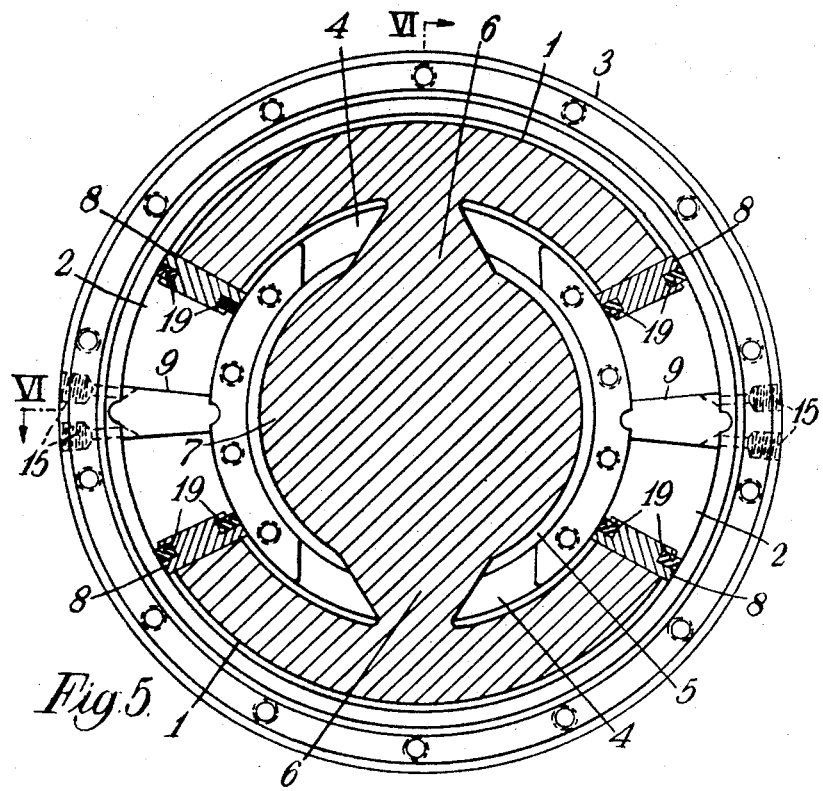
Figure 6:
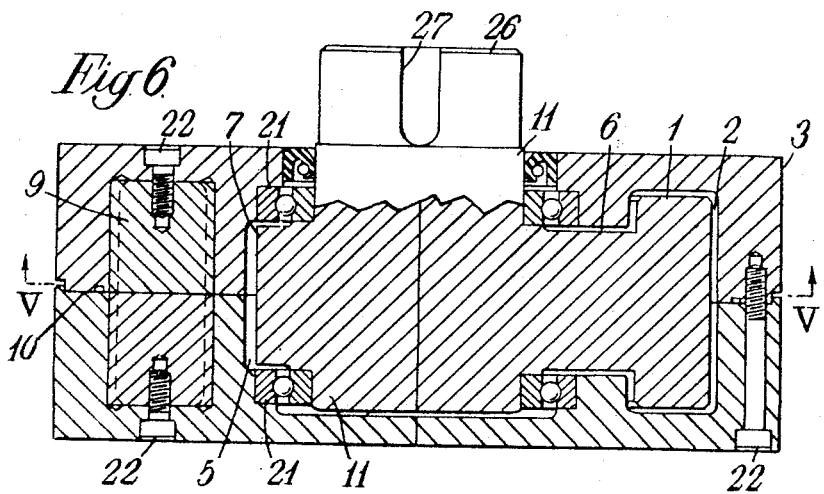
Figure 7:
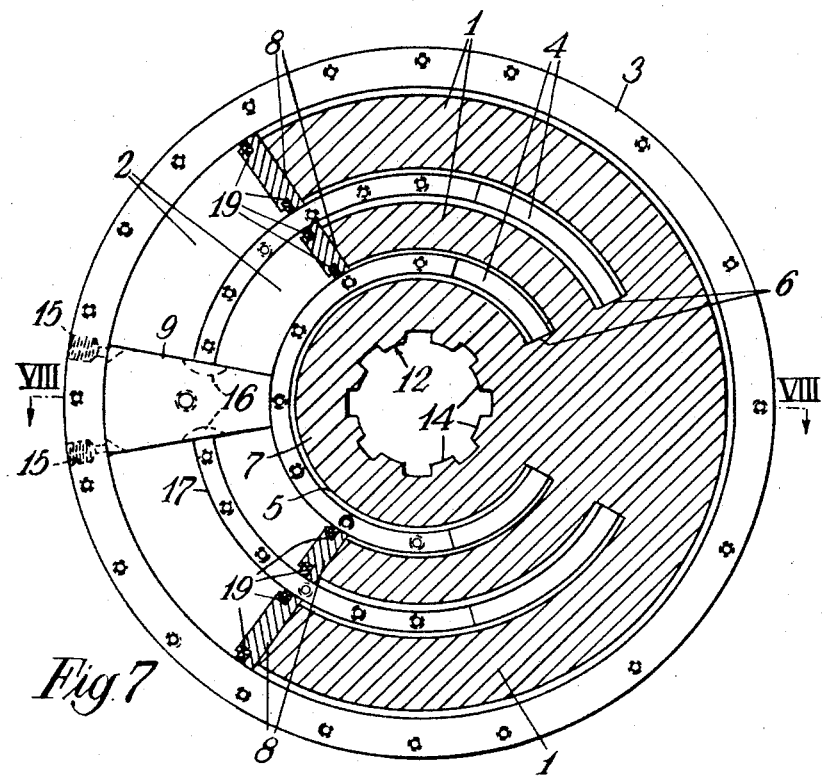
Figure 8:
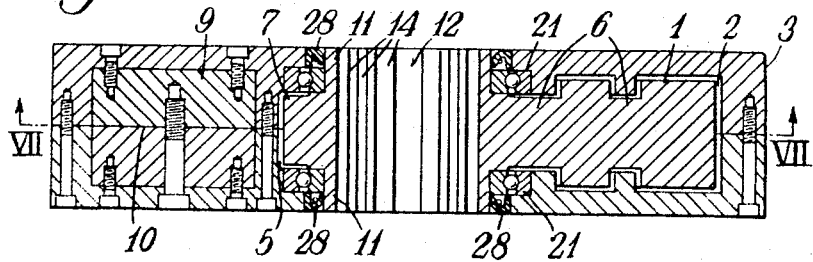
Figure 9:
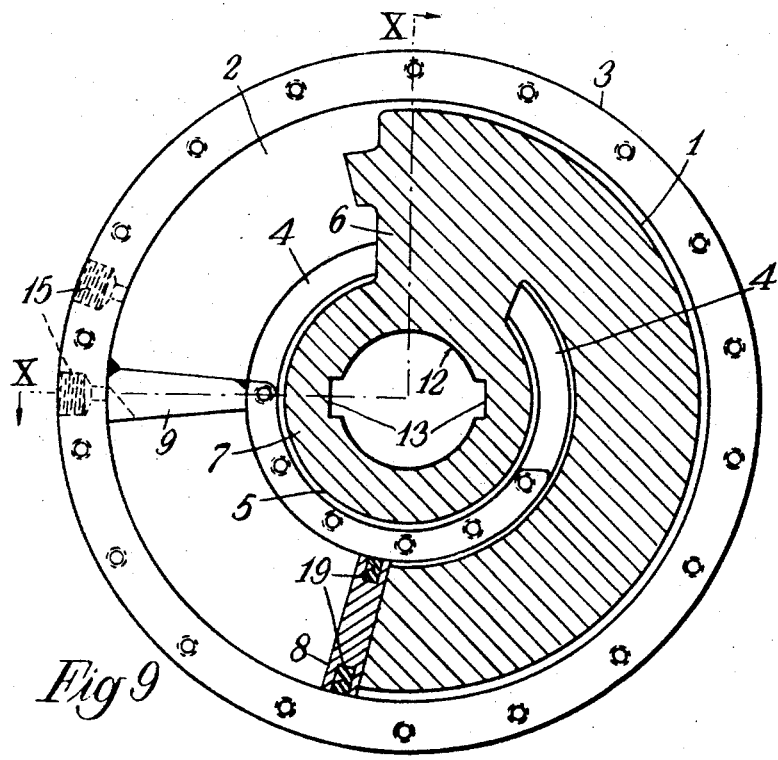
Figure 10:
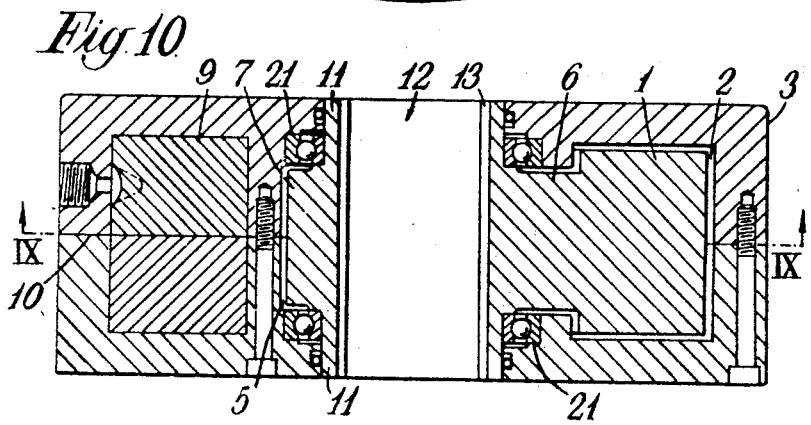
Figure 11:
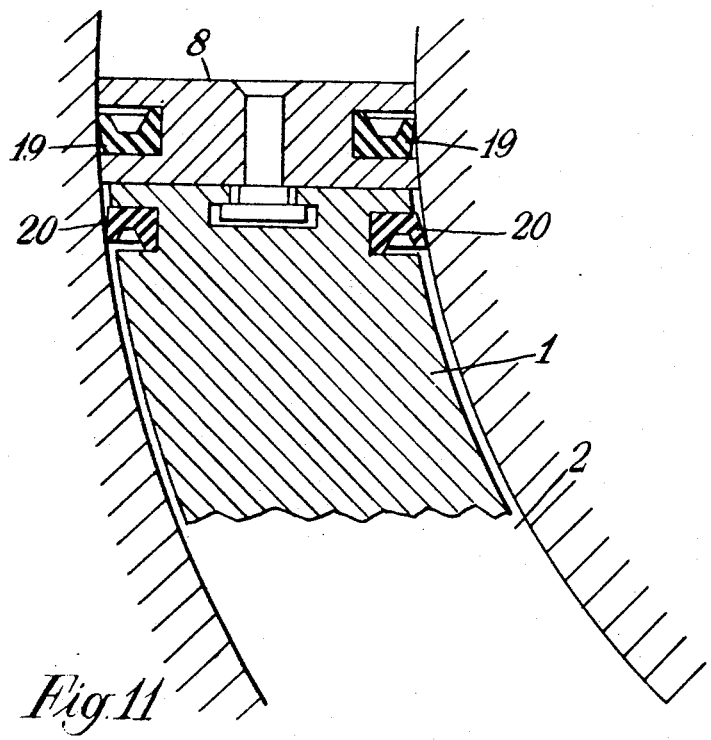
Figure 12:
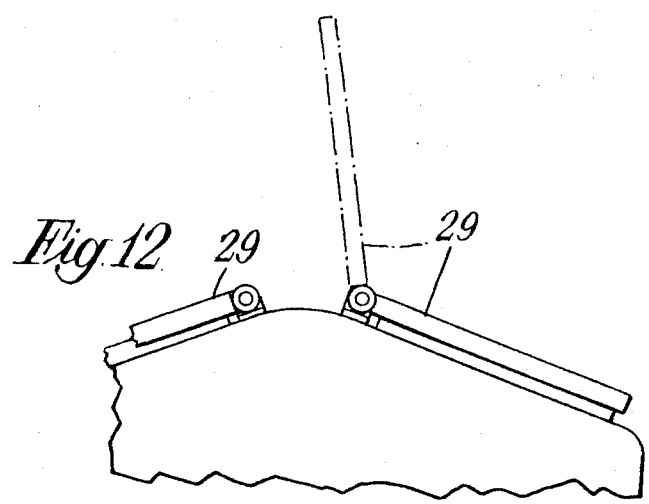

FIGURE 1 shows a form of embodiment of an oscillating fluid engine driven actuator according to the invention, seen in section along the line I—I in FIGURE 2, FIGURE 2 shows the same embodiment seen in section along the line II—II in FIGURE 1, FIGURE 3 shows an alternative embodiment in section along the line III—III in FIGURE 4, FIGURE 4 shows the alternative embodiment in section along the line IV—IV in FIGURE 3, FIGURE 5 shows a second alternative embodiment in section along the line V—V in FIGURE 6, FIGURE 6 shows the second alternative embodiment in section along the line VI—VI in FIGURE 5, FIGURE 7 shows a third alternative embodiment in section along the line VII—VII in FIGURE 8, FIGURE 8 shows the third alternative embodiment in section along the line VIII—VIII in FIGURE 7, FIGURE 9 shows a fourth alternative embodiment in section along the line IX—IX in FIGURE 10, FIGURE 10 shows the fourth alternative embodiment in section along the line X—X in FIGURE 9, FIGURE 11 shows the end of an annular piston according to the embodiment shown in FIGURES 9 and 10 in section along the median plane of the piston, and FIGURE 12 shows the arrangement according to FIGURES 9–11 used to open a skylight.

Embodiment I (FIGURES 1 and 2)

An annular segment-shaped piston 1 is slidably mounted with play in an annular segment-shaped chamber 2, preferably with rounded corners (see FIG. 2), in an casing 3. The casing 3 is provided with a central shaft bore 5 and with a sector-shaped clearance gap 4 located between the chamber 2 and the shaft bore 5. A shaft 7, 11, which is formed as a hub, is located within the shaft bore 5 and mounted in the casing 3 by means of ball bearings 21. The shaft 7, 11 is integrally formed with the piston 1 by means of an arm 6.

The shaft 7, 11 may advantageously be provided with a central bore 12 having a keyway 13 for fixing it to an oscillating shaft (not shown). The chamber 2 is provided with a radial partition 9 that is situated diametrically opposite to the center of the clearance gap 4. Both ends of the annular piston 1 are provided with sealing members 19 of rubber, synthetic rubber or other resilient material, adapted to sealingly bear against pressure directed at the ends of the piston. The sealing members are held in place by fittings 8, which are attached to flanged ends of the annular segment-shaped piston 1 and are radially displaceable on planar ends of the pistons 1 relative to the centre-line of the annular segment. The casing 3 is formed in two parts connected along a plane 10, which is so disposed as to pass along the axis of symmetry of the arm 6 and of the annular segment-shaped piston 1. The two halves of the casing are fixed together by means of bolts 22. The partition 9 may advantageously be divided along the plane 10 and fixed to the respective halves of the casing by means of bolts 23. The casing 3 is provided with inlet and outlet passages for the fluid under pressure which are located on each side of the partition 9 (not shown).

Embodiment II (FIGURES 3 and 4)

This embodiment differs from the Embodiment I in that the casing is formed as a circular cylindrical jacket 24, having two substantially planar flanged ends 25, and is fixed to the jacket by means of bolts 22. The partition 9 is equipped with sealing members 18 which sealingly engage the walls of the chamber 2. The inlet and outlet passages 15 are shown in this embodiment.

Embodiment III (FIGURES 5 and 6)

This embodiment differs from Embodiment I in that a pair of diametrically opposed annular segment-shaped pistons are located in the annular segment-shaped chamber 2 of the casing. Each of the pistons is joined to the shaft 7, 11, each by an arm 6. The casing 3 has a pair of diametrically opposed sector-shaped clearance gaps 4 and a pair of diametrically opposed partitions 9, placed between the two sector-shaped clearance gaps 4. The hub 7, 11 has a journal 26, which projects out of the casing on one side and is provided with a keyway 27. This embodiment has proved particularly suitable for applications wherein a limited angular rotation with a great power is required, for instance, in the steering gear for ships. The casing 3 is provided with four ports 15 leading to the chamber 2 and arranged on each side of both partitions 9.

Embodiment IV (FIGURES 7 and 8)

This embodiment differs from Embodiment I in that it has two concentrically arranged annular segment-shaped chambers 2, an arm 6 is provided with a pair of annular pistons 1, one in each annular chamber 2. The central bore 12 for the shaft 7, 11 is in this case provided with a plurality of splines 14. The partition 9, which passes through both the chambers 2 and an intermediate wall 17 separating these chambers 2, is provided with transfer ports 16, arranged on each side of the partition 9 so that the fluid can enter or leave the ends of both chambers 2. The casing 3 is provided with sealing rings 28 of known design as well as ball bearings 21. This embodiment is particularly suitable where great torque is needed but space is limited in the axial direction along the oscillating shaft.

Embodiment V (FIGURES 9, 10, 11 and 12)

This embodiment differs from Embodiment I in that the annular segment-shaped piston 1 is connected with the arm 6 near the one end of the said piston 1 and that only the opposite end of the annular segment-shaped piston 1 is provided with sealing members 19. Accordingly, the clearance gap 4 may have a wider opening angle than that of Embodiment I, thereby the annular segment-shaped piston 1 may have a longer stroke. The arrangement according to this form of embodiment has proved to be particularly suitable in those cases where the annular piston actuator is to be used for work requiring pivoting in angles greater than 90°, for example, in the case of a skylight 29 (see FIGURE 12). It has proved advantageous in this embodiment (FIG. 11) to provide an additional sealing means 29 (FIGURE 11) also within the end of the annular piston 1 that is provided with the member 19, to seal against the pressure directed backwards at the end of the annular piston.

Since the shaft 7, 11, the arm or arms 6 and the annular segment-shaped piston or pistons 1 are integrally formed there is no play between these parts. This has proved to be of great importance, especially when the piston actuator is used as steering gear, where the smallest play cannot be allowed. Further, since the sealing members 19 are set in radially displaceable fittings 8, effective sealing is achieved even where the arm or arms 6 is not absolutely accurate and the piston or pistons 1 is not accurately centered. This serves to make annular piston actuators much cheaper, with excellent sealing and no undesired play.

I claim:
1. An oscillating fluid-driven actuator comprising at least one annular segment-shaped piston mounted for oscillating movement in at least one correspondingly annular segment-shaped chamber, said piston integrally formed with a hub which is adapted to receive an oscillating shaft and at least one arm connecting said piston to the hub, and at least one end of said piston being substantially planar, fitting means radially slidably mounted on at least one planar end, each of said fitting means carrying a resilient sealing member for movement therewith so that each sealing member on said piston will continuously bear against the walls of the chamber.

2. An actuator as claimed in claim 1 wherein another piston is mounted on the arm concentric with said at least one piston and located in another chamber concentric with said at least one chamber, a partition is radially located in each chamber; and overflow ports are provided interconnecting said chambers on both sides of the partition.

3. An actuator as claimed in claim 1 in which the cross-section of the chamber is rectangular with rounded corners, and the casing is divided along a plane parallel to the plane of the piston and spaced between said rounded corners.

References Cited

UNITED STATES PATENTS

| | | | |
|---|---|---|---|
| 374,968 | 12/1887 | Kadel | 92—120 X |
| 1,032,694 | 7/1912 | Milne et al. | 92—120 X |
| 1,442,540 | 1/1923 | Ross | 92—120 X |
| 1,892,187 | 12/1932 | Drennon | 92—120 X |
| 2,540,903 | 2/1951 | Moushey et al. | 92—125 |
| 2,657,538 | 11/1953 | Myers | 92—120 |
| 2,936,636 | 5/1960 | Wacht | 92—120 X |
| 2,974,645 | 3/1961 | Wik | 92—120 X |
| 3,173,344 | 3/1965 | Mongitore | 92—120 X |
| 3,188,919 | 6/1965 | Sills | 92—120 X |

MARTIN B. SCHWADRON, *Primary Examiner.*

U.S. Cl. X.R.

92—177, 249